United States Patent [19]

Hakoyama et al.

[11] Patent Number: 4,652,155

[45] Date of Patent: Mar. 24, 1987

[54] PRINTER HAVING A THERMAL HEAD

[75] Inventors: Akiyoshi Hakoyama; Akira Sasaki; Nobuaki Fukasawa, all of Hitachi, Japan

[73] Assignee: Hitachi, Ltd., Tokyo, Japan

[21] Appl. No.: 746,098

[22] Filed: Jun. 18, 1985

[30] Foreign Application Priority Data

Jun. 18, 1984 [JP] Japan ................................ 59-123732

[51] Int. Cl.[4] ......................... B41J 3/20; G01D 15/10

[52] U.S. Cl. ............................... 400/120; 346/76 PH; 219/216; 219/494

[58] Field of Search ................... 400/120; 346/76 PH, 346/76 R, 153.1, 154; 219/216, 494, 492; 355/296, 300

[56] References Cited

U.S. PATENT DOCUMENTS

| | | | |
|---|---|---|---|
| 4,456,392 | 6/1984 | Nozaki et al. | 400/120 |
| 4,464,669 | 8/1984 | Sekiya et al. | 400/120 X |
| 4,558,328 | 12/1985 | Takanashi et al. | 400/120 X |
| 4,574,293 | 3/1986 | Inui et al. | 400/120 X |

FOREIGN PATENT DOCUMENTS

| | | | |
|---|---|---|---|
| 132415 | 1/1985 | European Pat. Off. | 400/121 |
| 73043 | 9/1976 | Japan | 400/120 |
| 24179 | 3/1981 | Japan | 400/120 |
| 170774 | 10/1982 | Japan | 400/120 |
| 199166 | 11/1983 | Japan | 400/120 |
| 208076 | 12/1983 | Japan | 400/120 |
| 11262 | 1/1984 | Japan | 400/120 |
| 67068 | 4/1984 | Japan | 400/120 |

*Primary Examiner*—Edgar S. Burr
*Assistant Examiner*—James R. McDaniel
*Attorney, Agent, or Firm*—Antonelli, Terry & Wands

[57] ABSTRACT

In a serial thermal transfer printer or serial thermal printer comprising; a thermal head having a plurality of heat elements arrayed in a line; and means for selectively energizing and driving the plurality of heat elements in synchronous relation with the relative movement between the thermal head and the ink ribbon or heat sensitive paper, wherein when printing dots are successively positioned in the direction of the relative movement between the thermal head and the ink ribbon or heat sensitive paper, printing timing of the last dot is set ahead so as to be earlier than normal printing timing. When the previous printing data is "1" (recording) and the subsequent printing data is "0" (not recording), the position of the present printed dot is shifted toward the previous printed dot to compress the entire width in case of two or more successive dots. Since the printing head is traveling continuously during printing, the position of the present printed dot can be shifted toward the previous printed dot by advancing the printing timing. If the previous printing data is "0" and subsequent printing data is "1", it is apparent that a similar effect can be obtained by setting the printing timing backward so as to shift the position of the present printed dot toward the subsequent printed dot.

9 Claims, 8 Drawing Figures

PRINTER HAVING A THERMAL HEAD

BACKGROUND OF THE INVENTION

The present invention relates to a printer having a thermal head, and more particularly to a serial thermal transfer printer or serial thermal printer which has a fast moving thermal head during printing.

In case of a thermal transfer printer or thermal printer, printing must be carried out so as to achieve a high speed in a state where a thermal head is moving with respect tō an ink ribbon or heat sensitive paper. Particularly, in a serial thermal transfer printer or thermal printer, the thermal head is moving at a substantially constant speed during printing because of a high moving speed of the thermal head.

Therefore, as shown in FIG. 8, the printed dots of a letter m are elongated in the direction of movement of the thermal head. In FIG. 8, H1 and H2 indicate heat element widths; D1 and D2 indicate printed dot widths; $g_o$ indicates a gap between adjacent dots; and $2W_o$ indicates successive 2 dots width.

The above laterally elongated form of the printed dots causes degradation of printing quality. Disadvantages are inherent in printing Chinese characters because they are not symmetrical and horizontal, part having white letters within black background, and vertical lines, such as letters m, w, M or W etc., tend to buckle. Thus the laterally elongated form of the printed dots degrades the printing quality and limiting the speed of the serial thermal transfer printer or thermal printer.

To improve the form of the printed dots, as shown in Japanese Utility Model Laid Open Publication No. 51-73043, there has been proposed a method such that each heat element on a thermal head is so designed that the dimension in the direction of movement of the thermal head is less than the dimension perpendicular to the direction of movement so that the printed dots are more nearly square.

However, this method has following drawbacks and has not been realized:

(1) applied power per unit area of the heat element is increased; hence pulse-resistant service life of the heat element is reduced;

(2) in a conventional wiring configuration where electrodes for energizing heat elements are led out laterally or in the direction of movement of a thermal head, the resistance value for each heat element is reduced so that the energizing current and the load of the driving element are both increased and the voltage drop due to common impedance is also increased, thereby adversely affecting printing quality; and (3) when a film thickness of the heat element is reduced, as a countermeasure against the term (2), to increase the resistance value thereof, the pulse-resistant service life is reduced and when attempting to raise the specific resistance of the material, the degree of freedom of selection of materials is greatly restricted.

SUMMARY OF THE INVENTION

An object of the present invention is to provide a printer having a thermal head wherein the printing quality can be improved.

Another object of the present invention is to provide a printer having a thermal head wherein the lengthwise and breadthwise unbalance of printing can be solved.

Another object of the present invention is to provide a printer having a thermal head wherein the buckle of vertical lines can be prevented.

Another object of the present invention is to provide a printer having a thermal head wherein moving of the thermal head during printing can be made fasten.

The present invention provides a printer having a thermal head comprising; a thermal head having a plurality of heat elements arrayed in a line; head driving means for bringing the heat elements into close contact with an ink ribbon or with heat sensitive paper; conveying means for moving the thermal head with respect to the ink ribbon or heat sensitive paper in the direction crossing the heat element line; and means for selectively energizing and driving the plurality of heat elements in synchronous relation with the relative movement between the thermal head and the ink ribbon or heat sensitive paper, wherein when printing dots which are successively positioned in the direction of the relative movement between the thermal head and the ink ribbon or heat sensitive paper, printing timing of the last dot is set ahead so as to be earlier than normal printing timing.

Usually, a Chinese character font more than 24×24 dots is designed to have a vertical line comprising 2-dot rows and a horizontal line comprising 1-dot rows. Therefore, against the degradation of printing quality there can be obtained a sufficiently effective improvement by reducing the width of the forward dot of the successive 2 dots.

To compress the entire width of the more than 2 dots, the following algorithm is adopted in the present invention.

More specifically, when the previous printing data is "1" (recording) and the subsequent printing data is "0" (not recording), the position of the subsequent printed dot is shifted toward the previous printed dot to compress the entire width in case of two or more successive dots.

Because the printing head is traveling continuously during printing, the position of the subsequent printed dot can be shifted toward the previous printed dot by advancing the printing timing.

Conversely, if the previous printing data is "0" and subsequent printing data is "1", an effect can be obtained by setting the printing timing backward so as to shift the position of the previous printed dot toward the subsequent printed dot.

According to the present invention, the basic problem of asymmetrical printed vertical and horizontal lines which has been evident with all high-speed serial thermal transfer (or thermal) printers, can be solved in practice, thereby realizing an improvement in the printing quality. Conversely, when printing quality is unchanged, it is possible to realize a further increase in printing speed.

Further, application of the present invention permits simpler design of the thermal head; hence, it reduces cost of the thermal head as well as improves the reliability thereof.

DETAILED DESCRIPTION OF THE PREFERRED EMBODIMENTS

Hereinafter, one embodiment of the present invention will be described with reference to drawing.

Figure 1:
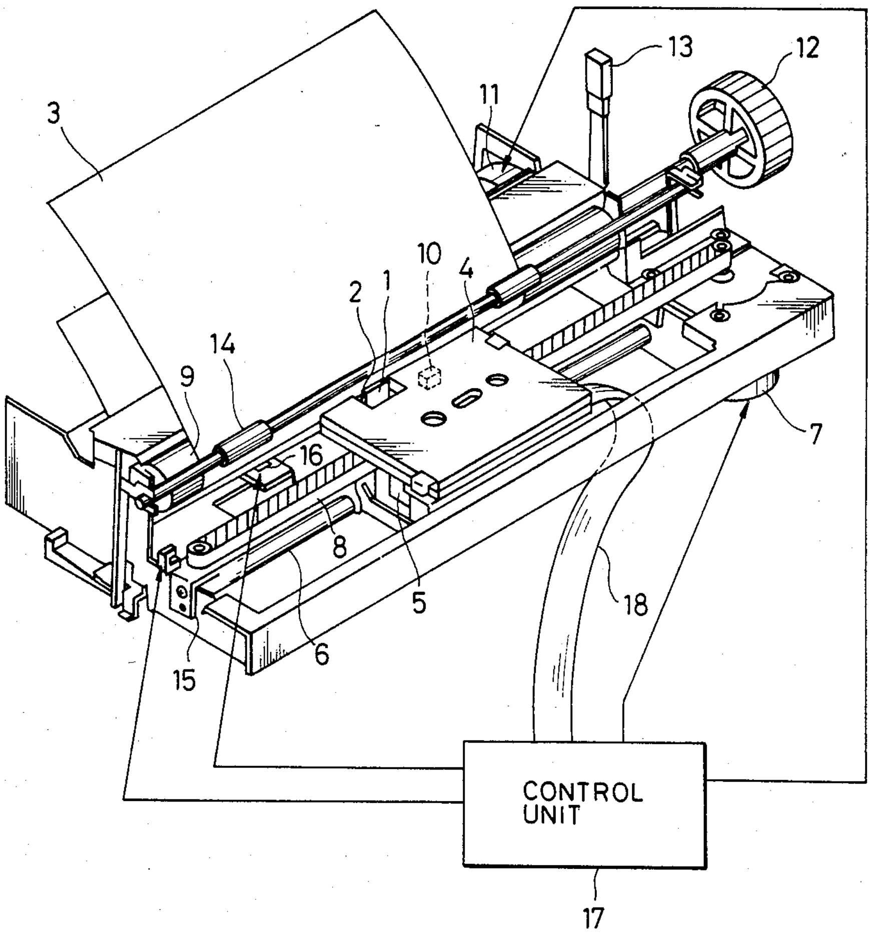
FIG. 1 is a constitutional view of a thermal transfer printer according to the present invention.

FIG. 1 is a view showing the constitution of a thermal transfer printer to which the present invention is applied. Heat elements on a thermal head 1 are energized and heated in a state where the thermal head 1 is pressing an ink ribbon 2 into close contact with a transfer paper 3, to thereby partially melt solid ink coated on the ink ribbon 2 with the generated heat for transferring the ink onto the transfer paper 3, so that printing is carried out.

The ink ribbon 2 is accommodated within a ribbon cassette 4, which is detachably mounted on a carriage 5 together with the thermal head 1. The carriage 5 is movable transversely along a slide shaft 6 and a carriage driving motor 7 drives the carriage 5 back and forth transversely via a timing belt 8.

Within the carriage 5 there are accommodated a ribbon sensor 10, a head traction mechanism for pressing the thermal head 1 against the side of a platen 9, an ink ribbon take-up mechanism, as well as a skip mechanism adapted to stop the ink ribbon 2 take-up when the thermal head 1 is not being pressed to the platen 9.

A paper feed roller under the platen 9 presses the transferred paper 3 against the platen, and a line feed motor 11 rotates the platen 9 through a gear so that the transfer paper 3 is friction fed. A platen knob 12 for manually operating the platen 9 and a release lever 13 for manually rotating a paper retaining roller 14 are provided, respectively.

A home position sensor 15 for detecting a reference position of the carriage 5, a paper sensor 16 for detecting control section 17 for controlling the printer, and a flexible substrate 18 for connecting the control section 17 and electric parts mounted on the carriage 5 which is capable of moving transversely are provided, respectively.

Figure 2:
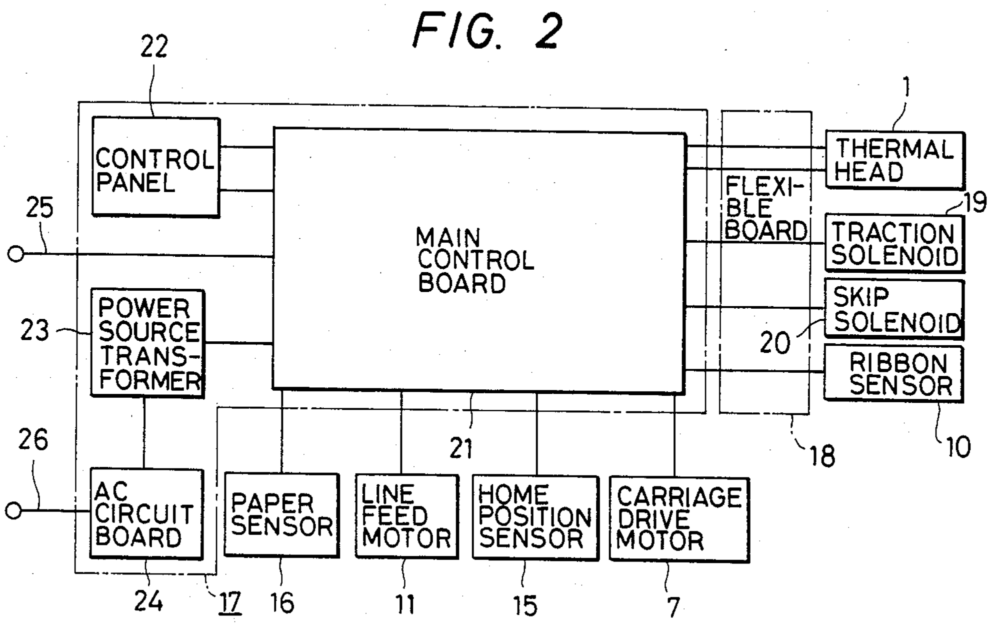
FIG. 2 is a constitutional view of a control system shown in FIG. 1.

FIG. 2 is a block diagram showing the constitution of the control section 17 and the electrical components mounted the carriage 5. The control section 17 comprises a main control substrate or main control board 21, a control panel 22, a power supply transformer 23, and an AC circuit board 24 including a power switch. An interface input/output 25 is connected to the main control substrate 21 and an AC power supply input 26 is connected to the AC circuit board 24, respectively.

A traction solenoid 19 as a power source for the head traction mechanism and a skip solenoid 20 as a power source for the skip mechanism are provided. The power source of the ribbon take-up mechanism is a relative movement of the carriage 5 and the one side of the timing belt 8.

Figure 3:
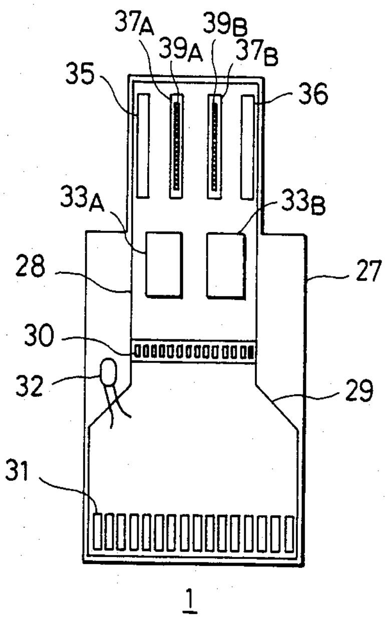
FIG. 3 is a constitutional view of a thermal head.

FIG. 3 is a constitutional view of the thermal head 1. The ceramic substrate 28 and the flexible substrate 29 are connected to each other at a plug-in portion 30 and are both bonded onto the heat sink 27. A plug-in portion 31 for connection with the exterior. A thermistor 32 for detecting temperature of the heat sink 27, the thermistor 32 being bonded onto the heat sink 27.

The ceramic substrate 28 includes four lines of thin thermal resistance glass layers, hereinafter referred to as glaze layers, formed thereon. Heat element lines 39A, 39B made of thin film resistors are formed on the central two glaze layers 37A, 37B. The glaze layers 35, 36 on both sides serve as dummies for securing contact stability between the thermal head 1 and the ink ribbon 2.

Driver IC's 33A, 33B for respectively driving the heat element lines 39A, 39B, each of which combination has the circuit constitution are provided on the ceramic substrate 28. Those two heat element lines 39A, 39B take partial charge of the printing, one of which prints even lines and the other of which prints odd lines, and those two heat element lines 39A, 39B being energized alternately.

Figure 4:
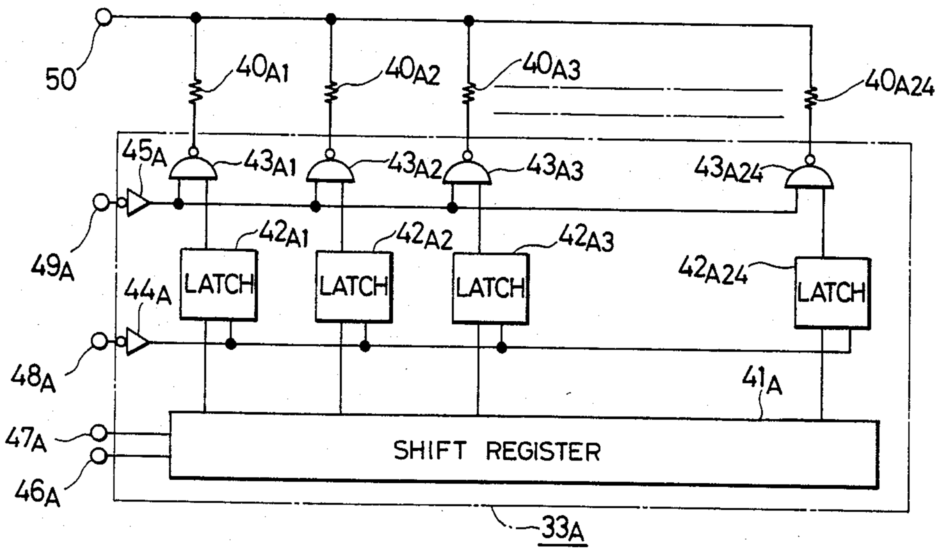
FIG. 4 is a circuit constitution diagram of a heat element line and a driver IC.

FIG. 4 is a circuit constitution diagram of the combination of the heat element line 39A and the driver IC 33A. The combination of the heat element line 39B and the driver 33B has the same circuit constitution, so the description thereof will be omitted herein.

A printing data of one line (vertical 24×horizontal 1 dots) from the control section 17 is transferred serially through a transfer data signal 46A and a transfer clock signal. Then, the printing date is stored in a 24-bit shift registor of the driver IC 33A. A latch signal 48A causes the printing data transferred to be loaded in the latches 42A1 to 42A24 through an invertor 44A.

Output terminals of NAND gates 43A1 to 43A24 are connected to the heat elements 40A1 to 40A24, respectively, and which directly switch the current for energizing the heat elements 40A1 to 40A24.

A strobe signal 49A controls an energizing time for the heat elements 40A1 to 40A24. Energizing the heat elements 40A1 to 40A24 is controlled based on both the printing data stored in the latches 42A1 to 42A24 and the AND conditions of the strobe signal 49A. A power supply input 50 for driving the heat elements 40A1 to 40A24 is connected to the heat elements 40A1 to 40A24.

Figure 5:
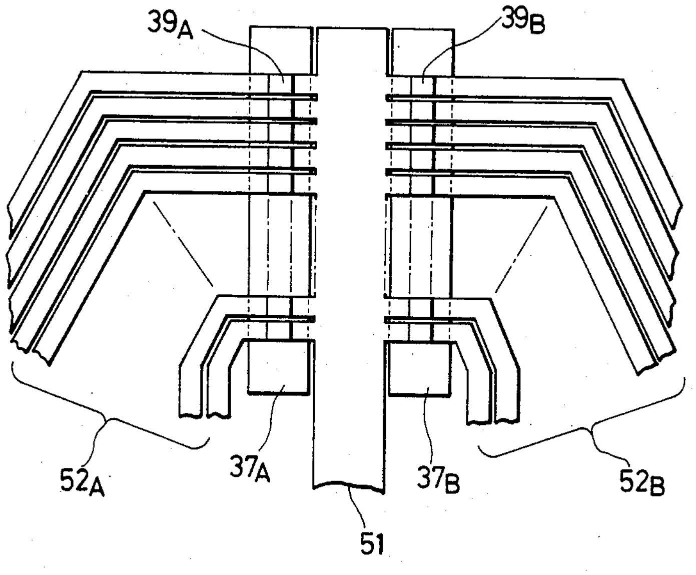
FIG. 5 is an enlarged view of the vicinity of heat element lines.

FIG. 5 is an enlarged view of the vicinity of the heat element lines 39A, 39B. A common electrode 51 as connected to the power supply input 50A for driving the heat elements and individual electrodes 52A, 52B are connected to output stages of the driver IC's 33A, 33B, respectively.

Figure 6:
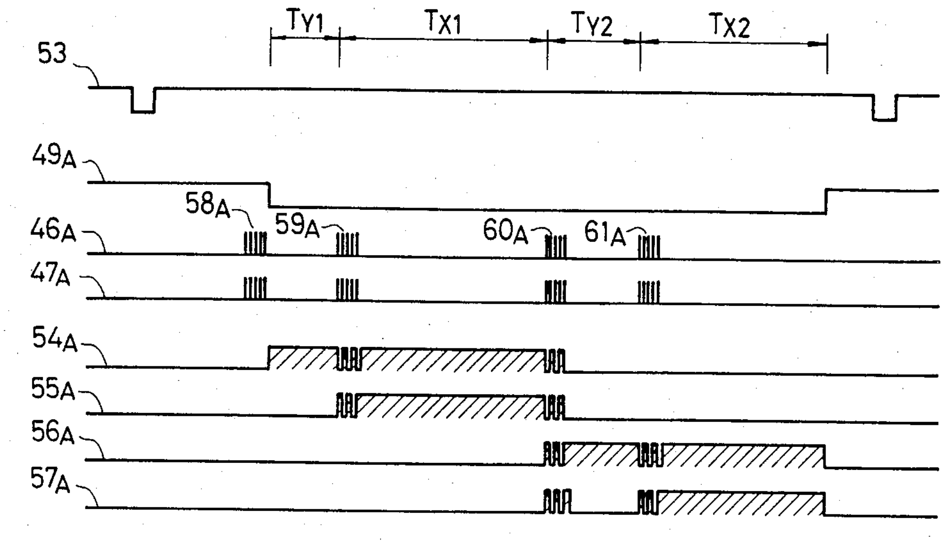
FIG. 6 is a signal waveform view relating to control of the thermal head.

FIG. 6 is a signal waveform view showing control timing of the thermal head 1. A timing signal 53 is generated in the main control substrate 21 to drive the carriage driving motor 7. Printing of one line (vertical 24×horizontal 1 dots) is carried out in synchronous relation with the timing signal.

The printing data or preheating data 58A to 61A is to be energized in periods during $T_{Y1}$, $T_{X1}$, $T_{Y2}$ and $T_{X2}$, respectively, during one timing signal 53.

Printing of a line is carried out in accordance with four modes allocated for each dot depending on the presence or absence of the previous printing as well as the presence or absence of the subsequent printing. There are two heat element lines 39A, 39B, one of which prints even lines and the other of which prints odd lines, those heat element lines 39A, 39B being energized alternately. Therefore, selection of the modes is made in accordance with the algorithm as shown in Table 1.

TABLE 1

| Next to Previous Printing | Previous Printing | Subsequent Printing | Modes of Present Printing (Waveforms of Energizing Currents) |
|---|---|---|---|
| 0 | 0 | 0 | 56A |
| 1 | | | 57A |
| 0 | | 1 | 56A |
| 1 | | | 57A |
| 0 | 1 | 0 | 54A |
| 1 | | | 55A |
| 0 | | 1 | 54A |
| 1 | | | 55A |

"0": Not Recording
"1": Recording

In FIG. 6, at 54A to 57A are energized current waveforms corresponding to four modes, respectively.

When the previous printing data is "1" (recording) and the subsequent printing data is "0" (not recording), the position of the present printed dot is shifted toward the previous printed dot. Therefore, the entire width in case of two or more successive dots can be compressed.

Since the printing head is traveling continuously during printing, the position of the present printed dot can be shifted toward the previous printed dot by advancing the printing timing.

Figure 7:
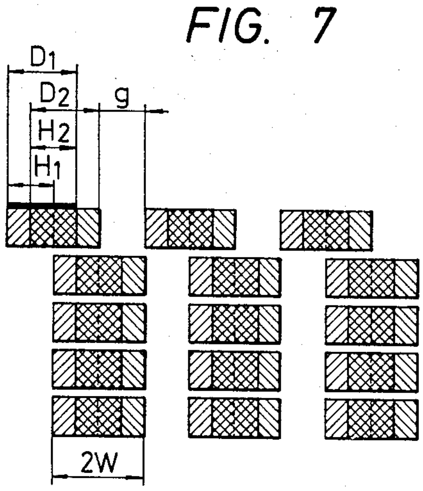
FIG. 7 is an explanatory view showing the form of the printed dots in the present invention.
Figure 8:
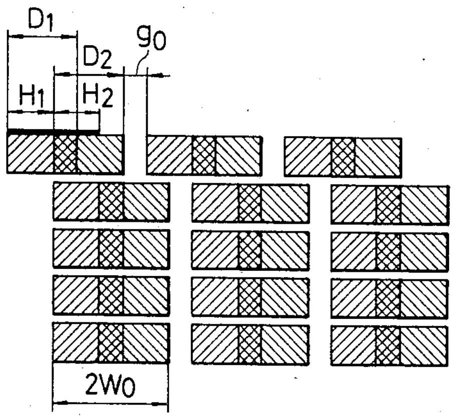
FIG. 8 is an explanatory view showing the form of the printed dots in a conventional thermal transfer printer.

As a result, as shown in FIG. 7, the printed position of the trailing dot among the laterally successive dots is shifted toward the previous printed dot, so that the width of vertical line comprising a plurality of dots is less.

In FIG. 7, the form of the printed dots of the letter m in the present invention is shown. In FIG. 7, H1 and H2 indicate heat element widths; D1 and D2 indicate printed dot widths, g indicates a gap between adjacent dots; and 2W indicates successive 2 dots width.

Furthermore, an offset in temperature due to the next to last printing, the previous printing for the heat elements, is also corrected, thus resulting in uniform density.

If the previous printing data is "0" and subsequent printing data is "1", it is apparent that a similar effect can be obtained by setting the printing timing backward so as to shift the position of the present printed dot toward the subsequent printed dot.

What is claimed is:

1. A printer having a thermal head comprising; a thermal head having a plurality of heat elements arrayed in a line; head driving means for bringing the heat elements into close contact with an ink ribbon or with heat sensitive paper; conveying means for moving said thermal head with respect to said ink ribbon or heat sensitive paper in the direction crossing the heat element line; and means for selectively energizing and driving said plurality of heat elemetns in synchronous relation with the relative movement between daid thermal head and said ink ribbon or heat sensitve paper, said means for selectively energizing and driving including means responsive to both previous printing data and subsequent printing data so that when printing dots are successively positioned in the direction of the relative movement between said thermal head and said ink ribbon or heat sensitive paper, printing timing of the last dot is set ahead so as to be earlier than normal printing timing.

2. A printer having a thermal head according to claim 1, wherein when printing dots are successively positioned, and the previous printing data is recording and the subsequent printing data is not recording, the position of a present printed dot is shifted toward the previous printed dot.

3. A printer having a thermal head comprising; a thermal head having a plurality of that elements arrayed in a line; head driving means for bringing the heat elements into close contact with an ink ribbon or with heat sensitive paper; conveying means for moving said thermal head with respect to said ink ribbon or heat sensitive paper in the direction crossing the heat element line; and means for selectively energizing and driving said plurality of heat elements in synchronous relation with the relative movement between said thermal head and said ink ribbon or heat sensitive paper, said means for selectively energizing and driving including means responsive to both previous printing data and subsequent printing data so that when printing dots are successively positioned in the direction of the relative movement between said thermal head and said ink ribbon or heat sensitive paper, printing timing of the first dot is set back later than normal printing timing.

4. A printer having a thermal head according to claim 3, wherein when printing dots are successively positioned, and the previous printing data is not recording and the subsequent printing data is recording, the position of a present printed dot is shifted toward the subsequent printed dot.

5. A printer having a thermal head comprising; a thermal head having a plurality of heat elements arrayed in a line; head driving means for bringing the heat elements into close contact with an ink ribbon or with heat sensitive paper; conveying means for moving said thermal head with respect to said ink ribbon or heat sensitive paper in the direction crossing the heat element line; and means for selectively energizing and driving said plurality of heat elements in synchronous relation with the relative movement between said thermal head and said ink ribbon or heat sensitive paper, said selective energizing and driving means including pulse generating means for generating pulses at a predetermined timing position for printing successive dots are successively positioned in the direction of relative movement between said thermal head and said heat ribbon or heat sensitive paper, said pulse generating means including means responsive to both previous printing data and subsequent printing data for enabling shifting the pulse timing position for the present printing data.

6. A printer having a thermal head according to claim 5, wherein said pulse generating means shifts the pulse timing position for the last dot to be printed of said successive printed dots ahead so as to be earlier than the predetermined timing position therefor.

7. A printer having a thermal head according to claim 5, wherein printing dots are successively positioned, and the previous printing data is recording and the subsequent printing data is not recording, said pulse generating means shifts the pulse timing position for a present printed dot toward the previous printed dot.

8. A printer having a thermal head according to claim 5, wherein said pulse generating means is responsive to both the previous printing data and the subsequent printing data for shifting the pulse timing position of the first dot of said successive printing dots to be later than the predetermined pulse timing position therefor.

9. A printer having a thermal head according to claim 5, wherein when printing dots are successively positioned, and the previous printing data is not recording and the subsequent printing data is recording, said pulse generating means shifts the pulse timing position of a present printed dot toward the subsequent printed dot.

* * * * *